July 29, 1969  R. E. LEMERY ETAL  3,457,811
BORING MACHINE WITH POWER ACTUATED TOOTH ADJUSTMENT
Filed Sept. 18, 1967  5 Sheets-Sheet 1

INVENTORS.
RAYMOND E. LEMERY
NORVIN E. NEWELL
BY
Wolfe, Hubbard, Voit, Osann
ATTORNEYS.

INVENTORS.
RAYMOND E. LEMERY
NORVIN E. NEWELL
BY
Wolfe, Hubbard, Voit & Osann
ATTORNEYS.

United States Patent Office 3,457,811
Patented July 29, 1969

3,457,811
BORING MACHINE WITH POWER ACTUATED TOOTH ADJUSTMENT
Raymond E. Lemery and Norvin E. Newell, Rockford, Ill., assignors to The Ingersoll Milling Machine Company, Rockford, Ill., a corporation of Illinois
Filed Sept. 18, 1967, Ser. No. 668,496
Int. Cl. B23b 47/00, 39/16
U.S. Cl. 77—57   21 Claims

ABSTRACT OF THE DISCLOSURE

A plurality of axially spaced and alined holes in a workpiece are bored by radially adjustable teeth correspondingly spaced along a bar which is inserted through the holes to boring position, fed forwardly to effect the boring, and withdrawn from the workpiece. Outward increment adjustment of the tooth to compensate for wear is effected after withdrawal of the tooth from the work and by a screw and nut and a worm and worm wheel incorporated in and on the bar including a ratchet wheel which is exposed at the side of the bar and advanced one step as it passes a pawl projected into the path of ratchet teeth so as to utilize the endwise movement of the bar to turn the wheel and set the tooth outwardly a small fixed increment when the need for such adjustment occurs in service use as determined by measuring the hole previously bored by the tooth.

Background of the invention

This invention relates to boring machines in which one or more aligned holes in a workpiece are bored by cutting teeth axially spaced along and projecting radially from a rotary bar or spindle advanced rapidly into a fixtured workpiece, fed forwardly to effect the boring and rapidly retracted in a conventional automatic cycle. Heretofore the teeth on such a bar have been mounted for fine outward adjustment to compensate for wear, the adjustment being made after the bar has been retracted and stopped at the end of the cycle. Such adjustments have been made manually and in varying lengths or in fixed increments by a power actuator with which the tooth adjuster becomes associated in the retracted and stopped position of the boring bar.

Summary of the invention

As in prior machines, a signal indicating the need for outward adjustment of a boring tooth of the above character is derived by measuring the diameter of a hole previously bored in a workpiece by such tooth. In one aspect, the present invention provides for outward adjustment of a cutter tooth in small increments of fixed length through the mounting on the boring bar of a member which actuates the tooth adjusting mechanism and which is mounted on the bar for movement through a fixed range relative to the bar by the blocking action of a stop adapted to be moved in the path of the member and in this position utilizes the axial movement of the bar for effecting the outward tooth adjustment and establishing the fixed length thereof.

More particularly, the adjusting member preferably takes the form of a toothed element or star wheel journaled on the boring bar with its teeth exposed for engagement with the stop at a proper time in successive boring cycles so as to be indexed step by step relative to the bar and thereby set the cutter tooth outwardly in corresponding increments.

The invention also resides in the use of a single stop activated selectively and successively in response to a plurality of undersized signals to actuate at proper times during the boring bar movement the indexing of star wheels corresponding to the teeth on the boring bar which have bored the undersize holes.

Description of the preferred embodiment

Figure 5:
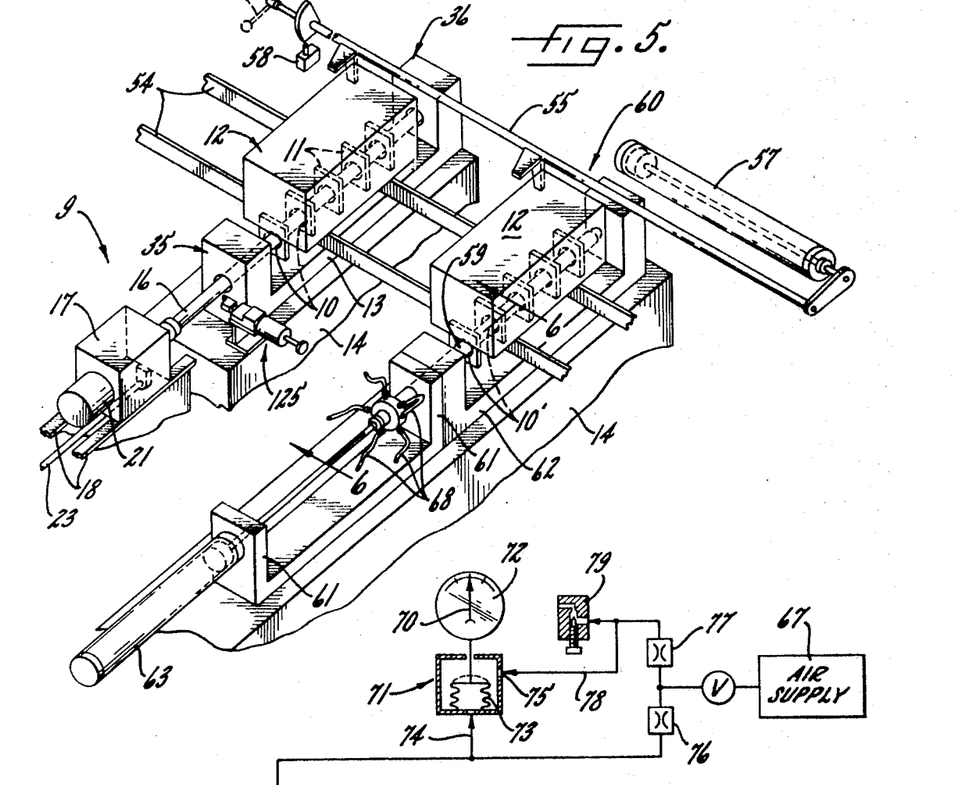
FIG. 5 is a fragmentary perspective view of the boring machine and an associated inspecting station.

The invention is shown in the drawings incorporated in a boring machine 9 (FIGS. 1 and 5) of the type commonly used for finish boring bearing holes 10 in the crosswebs 11 of an engine block 12 while the latter is secured to and located accurately in a fixture 13 (FIG. 5) on a bed structure 14. The boring is effected by short teeth 15 spaced along and projecting radially from a tool spindle or bar 16 supported cantilever fashion on a head 17 which is slidable back and forth along ways 18 formed on the bed and paralleling the axis of the bar. The latter is supported from the head through the medium of conventional floating tool holders 19 mounted on the outer end of a drive spindle 20 which is journaled in the head and operates during the boring to substantially aline the axes of the bar and the work holes 10.

During the boring, the bar is rotated at proper speed by an electric motor 21 on the head 17 which is advanced and retracted by a suitable power actuator herein shown as comprising a piston 22 having a rod 23 secured to the head and slidable in a cylinder 24 secured to the bed. Conventional mechanism (not fully shown) but including a common solenoid actuated reversing valve 135 (FIG. 14) is provided for controlling the flow of fluid to and from opposite ends of the cylinder to advance and retract the tool head in an automatic cycle including first advancing the head rapidly from the retracted position shown in phantom in FIG. 1 to position the teeth just short of the holes to be bored, and then continuing the advance of the head to effect the boring at a slow feed rate and to the position shown in FIG. 2, and finally retracting the spindle rapidly out of the workpiece to the starting position. Such cycling of the head may be effected through conventional circuitry controlled by switches LSa, LSf, and LSr (FIG. 1) mounted on the bed structure and spaced along the path of the head so as to be actuated at proper times by a cam 26 on the head. The switch LSa is actuated when the head completes the rapid approach while the switch LSf is actuaed to stop the spindle drive motor 21 and the feed of the head when the boring of the work holes is completed (FIG. 1) and initiate rapid return of the head. Actuation of the switch LSr interrupts the rapid return when the head reaches the starting position. With the spindle retracted, the bored workpiece may be unloaded from the fixture and another piece placed therein for boring in the next cycle of the machine.

Conventional and long used means such as a separate motor (not shown) is activated automatically after completion of a boring operation to turn the drive spindle 20 and an abutment arm 27 (FIG. 7) thereon against a retractible stop 28 and thereby locate the spindle with each cutting tooth 15 in the predetermined upright position shown in FIGS. 1 to 4 and 8. The boring bar is held in this angular position as it is retracted rapidly through the finished holes and while being projected through the rough holes of the next workpiece to be bored. The switch LSa may be utilized to retract the stop 28 and deenergize the positioning motor at the end of the rapid approach movement while the motor may be energized and the stop activated under the control of the switch LSf at the end of the feed advance and completion of the boring.

Figures 1, 2, 3, 4:
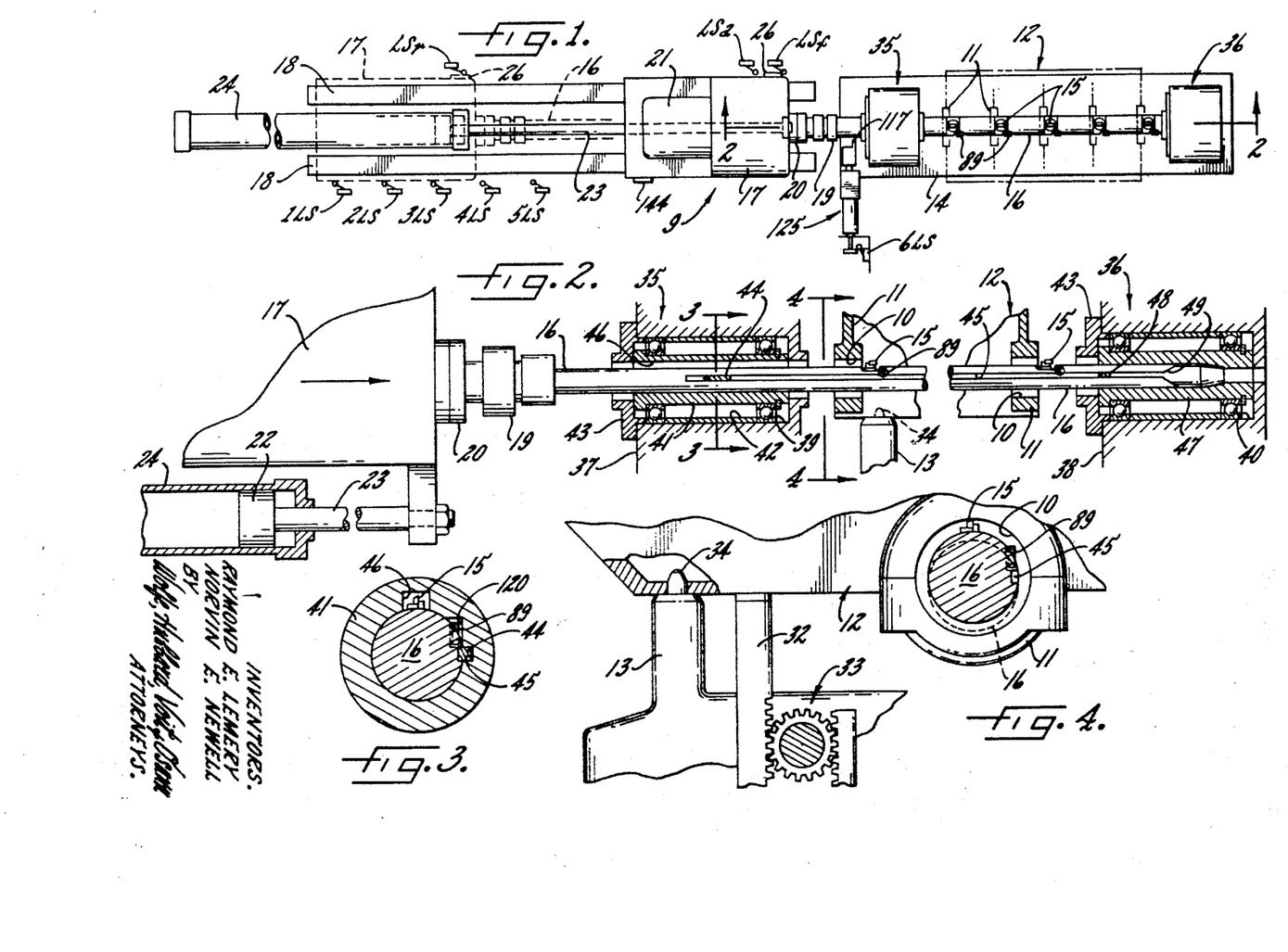
FIGURE 1 is a fragmentary and somewhat schematic plan view of a boring machine embodying the novel features of the present invention.
FIG. 2 is a fragmentary section taken along the line 2—2 of FIG. 1.
FIGS. 3 and 4 are fragmentary sections taken respectively along the lines 3—3 and 4—4 of FIG. 2.

During the rapid approach and rapid return movements, the work fixture is raised along the radius of the upright teeth 15 and above the operating position of the spindle shown in phantom in FIG. 4. The cutter teeth thus offset are adapted to pass through the holes 10 of the workpiece without contact with the walls thereof. For this purpose, a workpiece, after being loaded into the fixture, is supported by plungers 32 (FIG. 4) adapted to be raised and lowered by a suitable actuator 33. In its lowered position, the workpiece is located in the fixture by suitable dowels 34.

In the rapid advance, the spindle is projected through an inboard bearing support 35, the holes 10 of the fixtured workpiece and into an outboard support 36. These supports include casings 37 and 38 rigidly secured to and upstanding from the top of the bed 14 at opposite ends of the fixture 13 formed with bores whose walls 39 and 40 are closely concentric with the axis of the drive spindle 20. Herein, the inboard bearing is of the ball type having an inner race ring 41 adapted to receive and telescope around the inboard end portion of the boring bar and an outer ring 42 telescoped closely within the bore 39 and fixed therein by a cap 43. A key 44 (FIGS. 2 and 3) projecting inwardly from the interior of the inner ring 41 into a slot 45 along the boring bar serves to maintain a fixed angular relation between the ring and the bar in all longitudinal positions of the latter. In this relation, a slot 46 (FIG. 3) formed on the interior of and extending longitudinally of the inner race ring 41 is alined with the boring teeth 15 so as to permit retraction thereof through the bearing and out of the workpiece. The outboard bearing support 36 is similarly constructed and mounted including an outer ring secured in the casing 38 and an inner ring 47 having an inwardly projecting key 48 which enters between flaring walls 49 (FIG. 2) at the outboard end of the slot 45 in the bar near the end of the rapid approach movement of the latter. The ring is thus coupled positively to the bar during the boring.

The boring machine 9 above described may be one of a plurality of stations in a so-called transfer line in which workpieces are arranged in a row and shuttled in unison along a guide track 54 and dwelled and located in fixtures 13 at the different stations while being machined or inspected. Such step by step indexing may be effected automatically after termination of the machining cycles as by reciprocation of a bar 55 carrying arms that may, as by turning a handle 56 at a loading station, be swung laterally in behind the workpieces before the bar is advanced by a power actuator 57 which may be started by actuation of a switch 58 responsive to turning of the transfer bar into and out of work-engaging position.

The structure thus far described is conventional in the machine tool art including the automatic cycling of the tool heads at the machining stations and the correlation of the machining cycles with the indexing of the workpieces from one station to the next. In such an organization, it is customary at a station 60 to inspect the holes finish bored at a previous station and provide for outward adjustment either manually or automatically of those of the cutting teeth 15 which are boring holes smaller than the specified tolerance limit.

Figure 6:
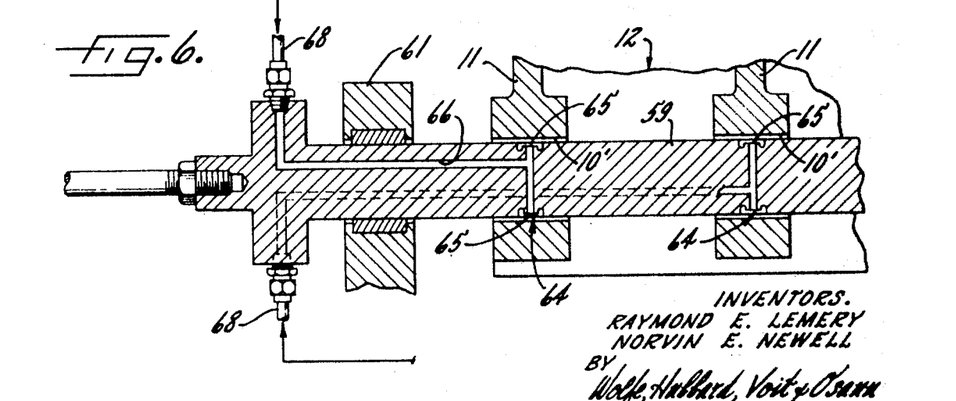
FIG. 6 is a fragmentary section taken along the line 6—6 of FIG. 5 including a fluid circuit.

Such inspection may be made by standard air gaging equipment of the kind illustrated in FIG. 6. For this purpose, a bar 59, like the boring bar 16 above described, projects cantilever fashion from and is slidable back and forth through spaced bearing supports 61 fixed to the bed 14 and supporting the bar for endwise movement, either manually or in synchronism with the boring machine cycle, back and forth into and out of the finish bored holes 10' of a workpiece indexed into and dwelling in the inspecting station. A suitable fixture 62 in this station secures and locates the workpiece with the holes alined accurately with the axis of the bar. Advance of the bar to the feeling position shown in FIGS. 5 and 6 may be effected by a reversible power actuator 63 activated under manual control or automatically in a cycle synchronized with the cycle of the boring head 17. That is to say, the bar 59 is projected into the holes of the workpiece after one advance of the transfer bar 55 and retracted out of the piece before the next advance.

Spaced along the inspection bar 59 according to the spacing of the holes 10 in the workpieces are conventional air gage feelers 64 (FIG. 6), one for each bore and each being of the type sold by Federal Products Corporation under the trade name Dimensionair and comprising a pair of orifices 65 opening outwardly from diametrically opposite sides of the bar 59 and each spaced a few thousandths of an inch from the surface of the finished bore 10' when the feeler is disposed therein as shown in FIG. 6. Through a passage 66 extending backwardly along the bar beyond the outboard bearing 61 thereof, the orifices of any feeler communicate with a source 67 of compressed air through a flexible lead-in pipe 68 and mechanism 71 which is responsive to changes in the pressure in the air supply passage 66. Of course, such pressure decreases as the spacing of any bore surface 10' from the orifices 65 increases due to wearing down of the cutting edge of the tooth 15 in the boring of holes in successive workpieces.

Wearing down of any one cutting edge to a radius that bores a hole smaller in diameter than the permissible tolerance may be detected and recorded automatically for subsequent use in controlling the tooth adjustments. In the present instance, the undersize condition of any one hole is observed on a dial 72 whose pointer 70 is swung back and forth by expansion and contraction of a bellows 73 the interior of which communicates at 74 with the feeler supply pipe which is separated from the air supply by a restriction 76. Enclosing the bellows is a casing which communicates at 75 with a pipe 78 leading to the air source through a similar restriction 77. By adjusting a needle valve 79, the escape of air from the pipe may be regulated while the feeler is in a master cylinder of the desired size so that the pointer 70 will be balanced when the feeler is activated in a hole of that size. Thus, in accordance with accepted air gaging technique and when the inspection bar is inserted in a bored workpiece with the feeler orifices disposed within the respective bores 10', the dial pointers 70 corresponding to the different bores will be disposed in positions corresponding precisely to the diameters of such bores.

The operator at the inspecting station may control the advance and retraction of the gage bar 59 by the actuator 63 as well as the supply of air to the individual gage orifices. With the gage bar in active position as shown in FIG. 6 and with air being supplied, the operator observes the dials corresponding to the different boring teeth and decides which of the teeth are boring undersize holes so as to require outward adjustment by one or more of the fixed increments. The operator then manually closes switches 81, 82 (FIG. 14) and others corresponding to the respective boring teeth needing adjustment, the signals thus derived being transmitted, stored, and utilized as later described in effecting outward adjustment of the corresponding boring teeth in the next cycle of the boring machine. The switches are usually of the push button type and grouped near the boring machine for convenient actuation by the operator observing the gage dials.

Built into the boring bar 16 in association with each of the cutter teeth 15 is a mechanism 85 which does not interfere with the insertion and removal of the bar into and out of the fixtured workpieces or through the bearing ring 41, which is adapted for power actuation when the driving part thereof is exposed outside of the workpiece and the bearing support 35, and which when actuated adjusts the tooth radially and outwardly in an increment of predetermined fixed length and of extremely small magnitude, for example, .0001 or .0002 of an inch.

The adjusting mechanism for each tool (see FIGS. 11–13) is disposed within the bar 16 and a recess 86 along the side thereof and, in accordance with the present invention, includes a driving member 89 which is moved relative to the bar through a fixed range by the blocking action of a retractible stop 117 which, when in active or blocking position utilizes the axial movement of the bar, preferably the rapid return motion, to move and establish the fixed length of the outward increment of adjustment of the cutter tooth. Preferably and in the present instance the member 89 takes the form of a star wheel journaled on the bar for turning through one step by engaging and passing by the stop 117 when the pawl is in active or blocking position, the endwise movement of the boring bar thus being utilized as a source of power for indexing the star wheel 89 and adjusting the cutter tooth 15 outwardly in predetermined increments.

Figure 11:
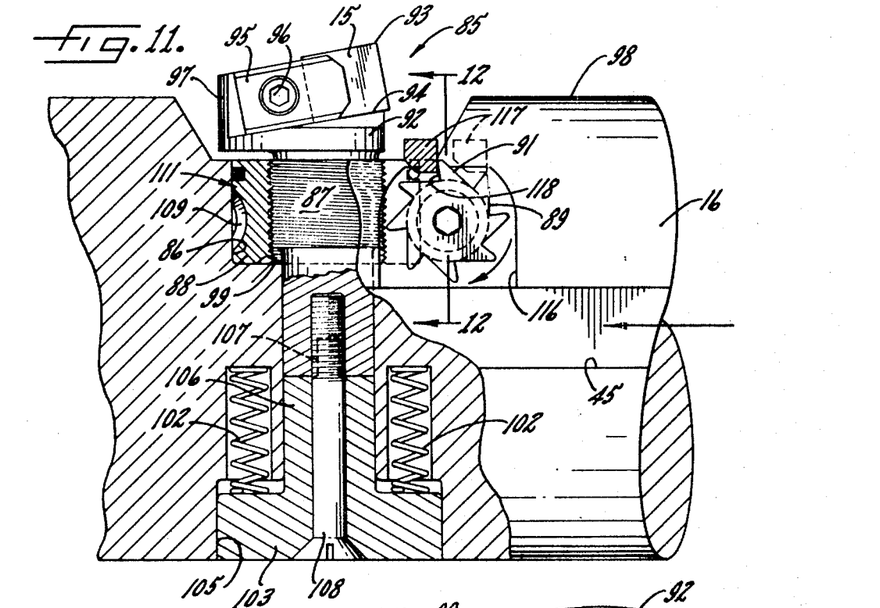
FIG. 11 is a fragmentary section taken along the line 11—11 of FIG. 8.
Figures 12, 13:
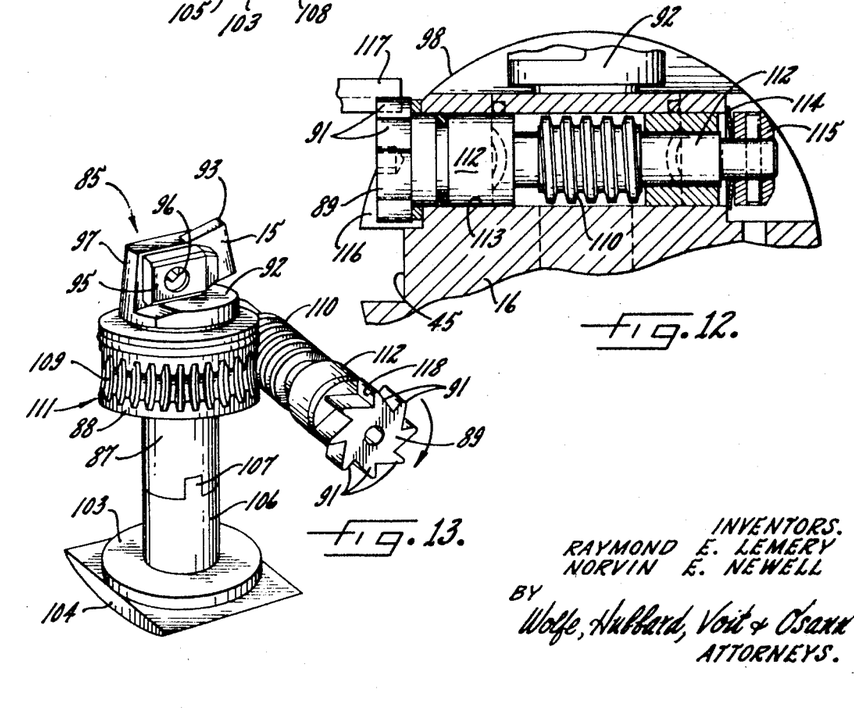
FIG. 12 is a fragmentary section taken along the line 12—12 of FIG. 11.
FIG. 13 is a perspective view of one tool adjusting mechanism.

To provide the desired small increments of tooth adjustment, the stepping movements of the star wheel are transmitted to the tooth through a worm 110 and worm wheel 111 and a nut 88 threaded onto a non-rotatable screw 87 by which the tooth 15 is supported. The screw projects transversely of the bar 16 and into the recess 86 and at its outer end is formed with a head 92 providing a seat for receiving and positioning the cutter tooth 15 which herein takes the form of a thin and flat rectangular wafer, one corner 93 of which constitutes the cutting edge. After seating of the tooth against an end surface 94 on the screw head, a clamp 95 is actuated by tightening of a screw 96 to fasten the tooth securely against the side of a lug 97 upstanding from the head 92. The tooth thus mounted is disposed at the proper cutting angles and the edge 93 is located properly for efficient finish boring of a hole 10 in the workpiece. The tooth 15 and that portion of its mounting which projects outwardly beyond the external surface 98 of the boring bar are narrow enough to pass through the slot 46 in the inboard bearing ring 41.

The screw 87 threads into and extends through the nut 88 which projects transaxially of the boring bar external surface and is seated against the bottom 99 of an outwardly opening recess 86 whose cylindrical inner wall forms a bearing in which the nut is journaled. Backlash at the screw threads is taken up by compression springs 102 seated in the opposite side of the bar 16 and acting against the head 103 of a block having a squared flange 104 (FIG. 13) thereon disposed in a recess 105 in the side of the bar opposite the tooth 15, the screw thus being held against turning. A stem 106 on the block is keyed at 107 into the inner end of the screw 87 and is secured to the latter by a screw 108 extending axially through the block. To form the worm wheel 111, teeth 109 are cut around the periphery of the nut 88 within the bearing surface 86. Meshing with these teeth is the thread of the worm 110 which is fixed on a shaft 112 journaled in a bore 113 extending crosswise of the boring bar. A Belleville washer 114 acting against a collar 15 on the inner end of the shaft takes up any backlash between the worm and worm wheel.

The star wheel 89 is fast on the outer end of the shaft 112 and the teeth 91 thereof, which are of ratchet configuration in the present instance, are of lengths and pitch to correspond to the desired individual increments of adjustment of the tooth considering the motion reduction effected through the worm and wheel and the screw thread. To expose the teeth 91 for engagement with the stationary blocking stop 117, the star wheel is disposed in a plane parallel to the boring bar axis and in a recess 116 in the side of the bar with the outer end portion of at least one of the teeth projecting outwardly beyond the bar surface 98 as shown in FIGS. 4 and 10–12. When the boring bar is turned against the stop 28 (FIG. 7), the star wheel will be disposed in a vertical plane, the leading side 118 of the upper tooth 91 faces in the direction of retraction of the bar. In this position it is adapted to engage and be blocked by the stop 117 while passing the stop if the latter is in active position (FIGS. 9–12). After such blocking, the continued retraction of the bar in the direction of the arrow in FIGS. 10 and 11 causes the wheel to turn clockwise (FIG. 11) until, by such turning, the engaged tooth face 118 slides inwardly and then under the stop.

The extent of such turning is determined by the length of the tooth 91 and the duration of its engagement with the stop and is correlated with the pitch of the wheel teeth so that, after one tooth passes the stop, the leading face 118 of the next adjacent tooth is left in upright position ready for engagement with the stop in a later cycle of the boring machine. By the worm and thread drive, the cutting tooth 15 is always locked securely after each adjustment.

A slot 120 (FIG. 3) is formed along the interior of the inner race ring 41 of the inboard bearing support 35 to allow the outwardly projecting teeth 91 of the star wheel 89 to pass during rapid return of the boring bar, such teeth, like the boring teeth 15, being alined along the boring bar.

Figures 7, 8, 9, 10:
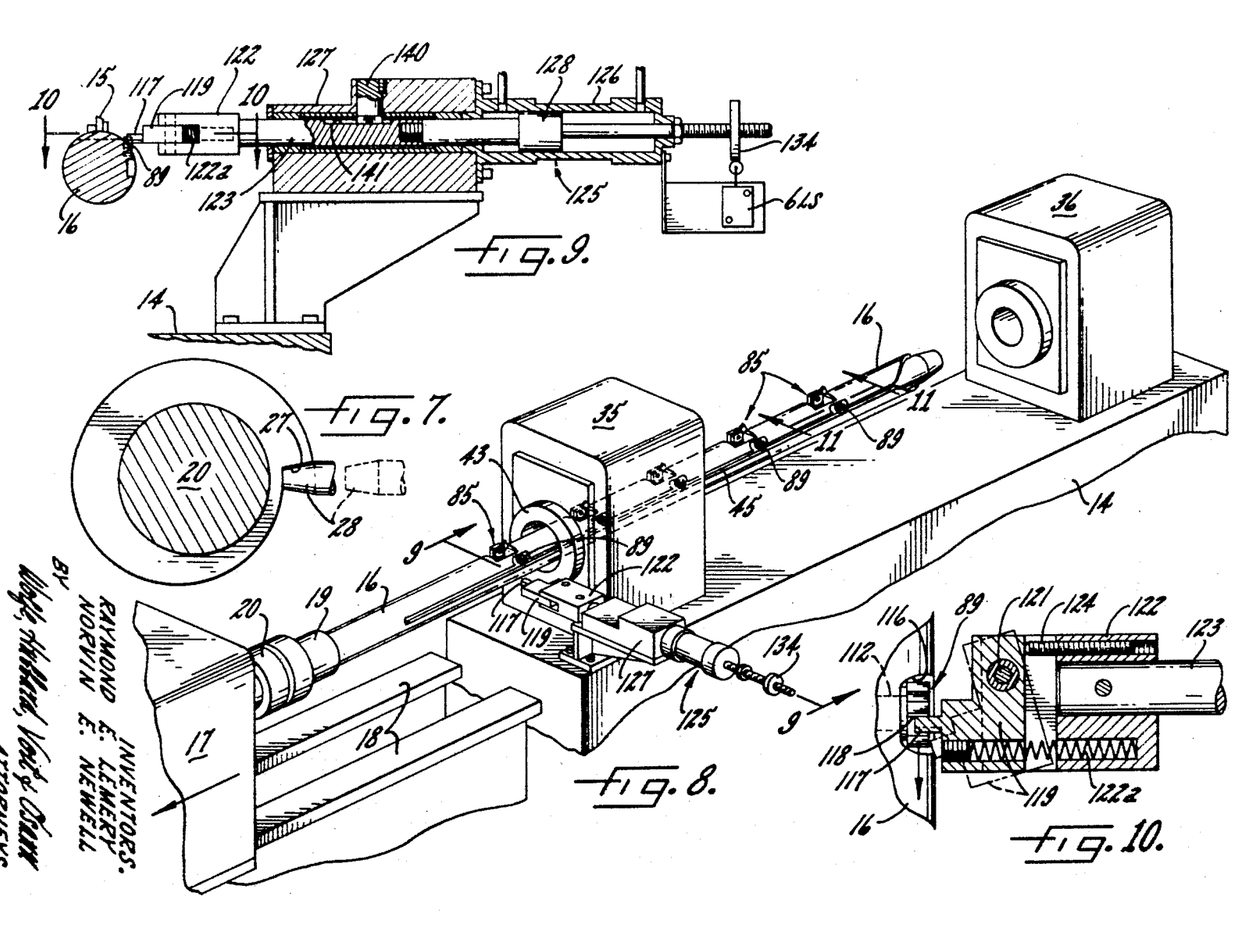
FIG. 7 is a fragmentary cross-section through the boring head showing the spindle positioning device.
FIG. 8 is a fragmentary perspective view of the boring bar and its mounting.
FIG. 9 is a fragmentary section taken along the line 9—9 of FIG. 8.
FIG. 10 is a fragmentary section taken along the line 10—10 of FIG. 9.

The stop or pawl 117 is mounted on the boring machine frame for movement transversely of the boring bar and into and out of the active blocking position shown in FIGS. 9–12 in which it is disposed in the path traversed by the projecting teeth 91 of the star wheels during retraction of the bar. Herein the stop is the end of a horizontally projecting arm of a bell-crank 119 fulcrumed at 121 on a head 122 on the end of a rod 123 which is adapted to move the stop into and out of the active position (FIGS. 9 and 10). A spring 122a acts on the bell-crank to hold the same and the stop in a normal active position determined by an adjustable stop 124 (FIG. 10). Thus, if an interference in the adjusting mechanism 85 exists at the time the stop 117 engages the star wheel, the spring will yield and allow the wheel to pass without danger of damaging the adjusting mechanism. A key 140 (FIG. 9) in the pawl guide 127 projects into a key way 141 to hold the stop against turning.

The pawl is adapted to be projected into and out of active position by a reversible power actuator 125 (FIGS. 8 and 9) which herein includes a piston 128 slidable in a cylinder 126 fixed to the boring machine frame adjacent the inboard bearing support 35 and between the latter and the head 17. The rod 123 supporting the stop is slidable in the guide 127 mounted on the machine frame and constitutes an extension of the rod of the piston. Thus, when compressed air is admitted to the outer end of the cylinder 126, the stop is projected from the retracted position (FIG. 8) into the active position (FIG. 9). In this position, it is positioned for engagement with an upright face 118 of the next ratchet tooth 91 to pass. The retracting motion of the boring bar is thus utilized as a source of power for indexing the star wheel and also for determining the extent of such turning so as to adjust the boring tooth outwardly the desired fixed increment.

In another of its aspects, the invention involves the activation of the stop 117 selectively according to which of the several boring teeth 15 are undersize and require outward adjustment. Thus, after one tooth on the bar passes the stop position and before the next star wheel passes, the stop may be advanced according to the need for adjusting such next tooth 15 whereupon the wheel corresponding to such tooth will be indexed one step or remain idle as the wheel passes and according to whether the stop is advanced or retracted. As a result, only one stop 117 and its actuator 125 is required for advancing any one or more of the star wheels of the adjusters 85 for the respective cutter teeth 15 during a single retraction of the boring bar.

Figure 14:
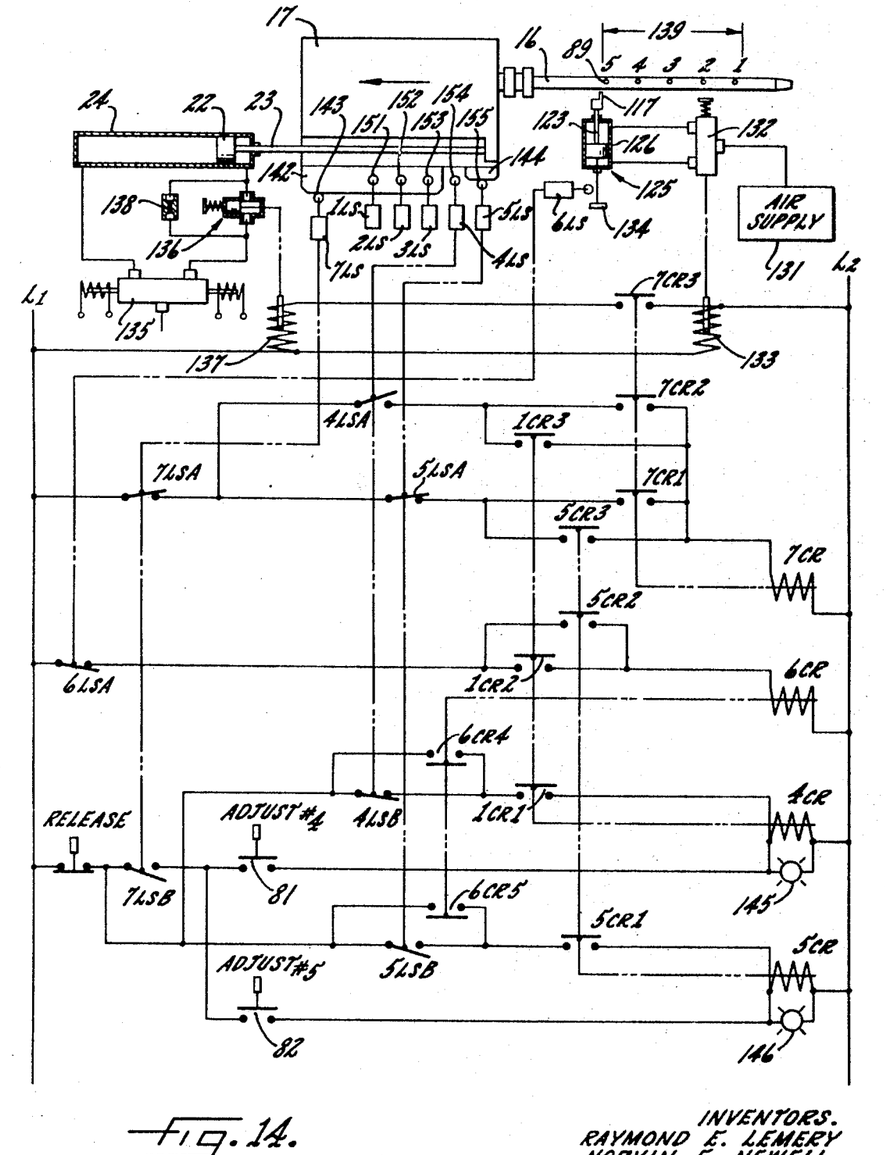
FIG. 14 is a schematic view and wiring diagram.

Through suitable circuitry such as that shown in FIG. 14, the undersize signals derived by measuring the finished bores as above described may be utilized to activate the tooth adjusting actuators 85 selectively and in synchronism with the cycles of the boring machine. Considering the circuit for a first one of the actuators, compressed air from a supply 131 is admitted to opposite ends of the cylinder 126 according to the position of a spring biased valve 132 which is shifted back and forth by the armature of a solenoid 133. Normally, when the solenoid is deeenergized, air is supplied to the stop end of the cylinder thus holding the rod of the actuator retracted as shown in FIGS. 8 and 14. Upon energization of the solenoid, air is released from the stop end and admitted to the head end of the cylinder causing the pawl 117 to be projected rapidly into the blocking position shown in FIG. 9 and in the path of a tooth 91 of the star wheel 89 next to pass the stop in the endwise retraction of the boring bar. A switch 6LS (FIG. 9) is closed when the piston 128 is retracted and until the pawl 117 reaches the advanced position at which time a cam 134 on the extended end of the piston rod 123 engages a follower and opens the switch.

While the star wheels 89 and the stop 117 may be arranged for activation while the boring bar is being advanced into a new workpiece, it is preferred to accomplish this during the rapid return of the bar out of the bored workpiece. Also, it is preferred to reduce the rapid return rate of the head whenever the stop 117 is in the advanced position thus indicating that the next star wheel to pass is to be advanced one step. For this purpose, the flow of pressure fluid to the head end of the cylinder 24 from the main cycle control valve 135 (FIG. 14) is normally through a valve 136 which is biased open and adapted to be closed by energization of a solenoid 137. In parallel with this valve is an orifice 138 which is sized to restrict the fluid flow and provide the desired reduced return rate of the bar while the solenoid is energized. The solenoids 133 and 137 are both energized in response to closure of a switch 7CR3 by energization of a relay 7CR.

Where, as here, the selection of the tooth adjusting mechanisms 85 to be actuated in the next boring machine cycle is effected manually instead of automatically, means are provided for preventing effective actuation of the selecting switches 81, 82 and the others during the parts 139 (FIG. 14) of the rapid approach or return strokes of the boring bar when the star wheels 89 of the different tooth adjusters are passing the retracted stop 117. Herein, this means includes a switch 7LSB which is held open during the part 139 of the rapid traverses by a cam bar 142 fixed to the head 17 and acting on the follower lever 143 of the switch 7LS to close the switch 7LSA and open 7LSB within the range 139 while reversing the condition of these switches when the bar is disposed beyond this range.

The stop 117 is projected into active position during the return stroke of thes boring bar each time the star wheel 89 corresponding to a boring tooth 15 needing adjustment is approaching the stop. To condition the circuits for this, a cam 144 somewhat shorter than the space between the star wheels along the boring bar 16 projects from the head 17 for engagement successively with followers 151–155 of switch units 1LS, 2LS, etc., each unit incorporating switches A and B which are closed and open as shown in FIG. 14 in the case of 5LS when follower 155 is riding the cam 144, the condition of the switches being reversed when the associated star wheel is approaching or has passed the stop. A similar pair of switches is associated with the follower 154 of the switch 4LS and of the followers for the other switches 3LS, 2LS and 1LS. The cam is long enough to slightly overlap adjacent ones of the followers 151–155.

Operation

Assuming that as a result of wearing off of the first tooth 15 nearest the head 17, it is determined by the operator of the inspecting gages that this tooth is undersize and requires adjustment but that the next adjacent tooth 15 is not undersize, the operator would thus close the switch 82 but not the switch 81. The switches 81, 82 are depressed and closed momentarily. This may be done effectually after all of the star wheels 89 during the rapid advance of the boring bar have passed through the range 139 and the switch 7LSB has been closed. As a result, relays 4CR and 5CR will be energized and green lights 145, 146 in parallel therewith are energized thus indicating the effectiveness of the selections. If the selection is attempted before this time, the open condition of the switch 7LSB will prevent energization of the relays 4CR, 5CR, etc., and the lights thus indicating to the inspection operator that the selection has been premature and should be repeated at the proper time in the boring machine cycle.

Assume now that the boring head has been beyond the range 139, the cams 142, 144 will release the followers 143 and 155 allowing switches 7LSB and 5LSB to close. Closure of the push button switch 82 will then complete the circuit for energizing relay 5CR and the signal lamp 146 thus closing switch 5CR1 to seal the circuit through 5LSB. At the same time, switch 5CR2 is closed thus energizing relay 6CR through switch 6LSA then closed because the pawl 117 is retracted. Closure of the switch 6CR5 establishes a sealing circuit for relay 5CR around 5LSB and 7LSB so that this relay remains energized after 7LSB is allowed to open as the cam 142 passes over the follower 143.

When the cam 144 engages the follower 155 corresponding to the first tooth adjusting unit to approach the stop 117 during retraction of the bar, the switch 5LSB is opened without deenergizing the relay 5CR, and the switch 5LSA is closed thus energizing the relay 7CR through 5CR3 and the switch 7LSA then held closed by the cam 142 during return of the head 17. Closure of a switch 7CR3 by this relay 7CR completes parallel circuits for energizing the solenoid 133 for admitting pressure fluid to the cylinder 126 for projecting the stop 117 to active position into the path of a tooth 91 of the star wheel 89 numbered 5 (FIG. 14). In this movement of the stop, the switch 6LSA is opened thus deenerigzing relay 6CR. The solenoid 137 is similarly energized to close the by-pass valve 136 so that the fluid for continuing the rapid return of the head 17 must flow through the restriction 138 thus producing the desired reduction in the speed of return of the boring bar while the stop 117 is engaging the star wheel to index the same one step as above described.

As the cam 144 passes out of engagement with the follower 155, the switch 5LSA is opened thus deenergizing the relay 7CR and the switch 5LSB is allowed to close thus readying the switch 82 for another selection after the inspection of another bored workpiece. All of the relays and th esolenoids 133 and 137 are thus deenergized assuming that the next adjuster 85 (numbered 4 in FIG. 14) is not to be actuated. But if the corresponding tooth 15 is to be set out one increment, the inspecting operator will have closed the switch 81 thus energizing relay 4CR through 4LSB as soon as the cam 144 engages the follower 154. Preferably this cam is made long enough to overlap adjacent ones of the followers 155–155 so that relay 7CR remains energized if the switches 81, 82 of two adjacent adjusters have been actuated. As a result, the stop 117 remains in active position to block the star wheel of the No. 4 adjuster 85 and, by virtue of the continued energization of the solenoid 137, the restriction 138 remains effective to maintain the reduced rate of retraction of the boring bar.

It will be apparent from the foregoing that through the circuitry and mechanisms above described, the retracting movement of the boring bar is utilized selectively to index through one step those of the star wheels 89 corresponding to the switches 81, 82, etc. whose push buttons have been depressed at the proper time in the boring machine cycle and stored in the separate devices formed by the relays 1CR, 2CR, etc., for use in next rapid retraction of the boring bar 16. That is to say, each star wheel whose control switch 81, 82, etc., has been selected by the inspecting operator will, under the control of a signal held in the corresponding storing device, be turned as it passes the stop 117 and the associated cutting tooth 15 will be set outwardly the desired fixed increment. On the other hand, the star wheels corresponding to the teeth 15 which are boring holes of proper size will pass idly by the stop 117 because, in the absence of a stored signal, the stop will be retracted out of the blocking position.

We claim as our invention:

1. In a machine for boring a hole in a workpiece, the combination of, a support for the workpiece, a tool head mounted thereon for reciprocation back and forth along a rectilinear path into and out of the workpiece, a rotatable spindle mounted on and projecting from said head parallel to said path, a boring tooth projecting from said spindle and guided therein for radial adjustment to vary the diameter of a work hole bored thereby, a shaft journaled in said spindle to turn about an axis perpendicular thereto, motion reducing means mounted in said spindle and transmitting the turning of said shaft to said boring tooth to set the same outwardly, a star wheel fast on said shaft adjacent said spindle and having teeth with sides each of which, when extending transversely of the spindle, is exposed and faces longitudinally of the spindle, and a stop on said support guided for movement transversely of said spindle into and out of a blocking position in the path of an exposed leading side of a tooth of said wheel, said stop when disposed in said blocking position operating, during engagement with a passing wheel tooth, to turn said shaft through a predetermined angle and thereby adjust the boring tooth outwardly a corresponding increment.

2. A boring machine as defined in claim 1 in which the pitch and length of the wheel teeth are such that upon disengagement of said stop from one tooth, the leading side of the next adjacent tooth is disposed in a predetermined position and extends transversely of said spindle.

3. The combination defined in claim 1 in which said motion reducing means includes screw and nut elements relatively rotatable to advance said boring tooth outwardly, a worm wheel rotatable with one of said elements and meshing with a worm fast on said shaft.

4. A boring machine as defined in claim 1 in which said boring tooth is spaced angularly around the spindle from the line of engagement between said stop and said wheel teeth.

5. A boring machine as defined in claim 1 in which said spindle is advanced into and out of a workpiece to effect the boring by said tooth and said stop is adapted for engagement with a tooth of said star wheel during the retraction of said spindle after the boring.

6. A boring machine as defined in claim 1 in which said star wheel is rotatable in a plane paralleling the axis of said boring and said leading tooth side projects outwardly beyond the exterior of said spindle for blocking by said stop and engagement therewith during turning of the wheel through said predetermined angle.

7. The combination with a boring machine as defined in claim 1 of gaging apparatus for measuring the diameter of a hole bored by said boring tooth and producing a signal indicative of an undersize condition of said hole, a device for receiving and storing such signal, and mechanism responsive to the stored signal and operable in timed relation to the endwise movement of said spindle to move said stop into and hold the same in said blocking position while said star wheel is passing the stop, said stop being held inactive in the absence of a stored undersize signal as the star wheel passes the stop.

8. A boring machine as defined in claim 1 including an additional boring tooth spaced along said spindle from said first boring tooth with a similarly constructed and mounted mechanism for adjusting the tooth outwardly in response to indexing of a second star wheel similarly engageable with said stop, said apparatus including means for measuring the diameter of said second hole and producing a second signal indicative of the undersize condition of such hole, a second device for receiving and storing said second signal, said mechanism also being controlled by said second device and operable in timed relation to the movement of said spindle in the presence of signals stored in each of said devices to dispose said stop in said blocking position while the first and second star wheels pass the stop, said stop being held in inactive position during the passing of either of said wheels in the absence of an undersize signal in either of said devices.

9. The combination defined in claim 8 in which said stop is moved to and from said blocking position by a power actuator adapted to be activated by a signal stored in either of said devices, and means responsive to the movement of said boring head to associate said actuator with said devices individually as the respective ones of said star wheels are approaching and passing said stop during endwise movement of said spindle.

10. In a boring machine, the combination of, a support, a tool head mounted thereon for reciprocation back and forth along a rectilinear path between retracted and advanced positions, a rotatable spindle mounted on and projecting from said head parallel to said path, a boring tooth projecting radially from said spindle and supported therein for radial adjustment to vary the diameter of a work hole bored thereby, a shaft journaled in said spindle to turn about an axis perpendicular thereto, a member fixed on said shaft and having a projecting surface extending transversely of the spindle, a stop mounted on said support for movement between a normally retracted position out of the path of said surface endwise movement of the spindle and an active position in said path to engage said surface and block said member whereby to swing the member through a predetermined angle in a direction opposite to the spindle advance until said surface rides over and past the stop, motion reducing means coupling said shaft and said tooth and converting the turning of said member through said angle into a corresponding outward adjustment of said boring tooth, and selectively controllable means for moving said stop into and out of the path of said member.

11. A boring machine as defined in claim 10 in which said member is a rotary star wheel having teeth successively engageable with said stop pin successive reciprocations of said spindle by said head.

12. A boring machine as defined in claim 11 in which said star wheel teeth are of uniform pitch and the lengths thereof are such that the wheel is indexed one tooth pitch in passing said stop when the latter is in said active position.

13. A boring machine as defined in claim 10 in which said surface on said member faces longitudinally of said spindle and in the direction of movement thereof during retraction of the spindle to withdraw the same out of a bored workpiece.

14. A boring machine as defined in claim 10 including a power actuator for said head operable to retract said spindle from the bored workpiece at a rapid rate, and means controlling the speed of said actuator and operable to reduce said rate substantially when said stop is in said active position and during the movement of said member past the stop.

15. In a boring machine, the combination of, a support, a tool head mounted thereon for reciprocation back and forth along a rectilinear path between retracted and advanced positions, a rotatable spindle mounted on and projecting from said head parallel to said path, a boring tooth projecting radially from said spindle and supported therein for radial adjustment to vary the diameter of a work hole bored thereby, a shaft journaled in said spindle to turn about an axis perpendicular thereto, means coupling said tooth and said shaft and converting the turning of the shaft into outward adjustment of the tooth, a member coupled to said shaft and mounted on said spindle for movement longitudinally thereof through a predetermined range to set said tooth outwardly a fixed small increment relative to the spindle, means for actuating said member as it passes a predetermined position during endwise movement of said spindle, and selectively operable mechanism for rendering said last mentioned means active and inactive.

16. In a boring machine, the combination of, a support, a tool head mounted thereon for reciprocation back and forth along a rectilinear path between retracted and advanced positions, a rotatable spindle mounted on and projecting from said head parallel to said path, a plurality of boring teeth spaced along said spindle and each projecting from the spindle, adjusting means in said spindle supporting the respective teeth for outward radial adjustment to increase the diameter of work holes bored thereby and each including a shaft journaled in said spindle to turn about an axis perpendicular thereto, a member fixed on said shaft and having a projecting surface extending transversely of the spindle and arranged in a row extending along the spindle, a stop mounted on said support for movement between a normally retracted position out of the path of said member surfaces during endwise movement of the spindle and an active position in which the stop is engageable with said surfaces and block said members whereby to swing the respective members successively through a predetermined angle in a direction opposite to the spindle advance until the free end of the member rides over and past the stop, motion reducing means for each of said members the same as the associated shaft and boring tooth and converting the turning of each member through said angle and effect a corresponding outward adjustment of the associated boring tooth, and selectively controllable means for moving said stop into and out of the path of selected ones of said members during the endwise movement of the bar.

17. A boring tool for enlarging a hole in a workpiece during rotation and axial feeding having, in combination, an elongated bar, a cutting tooth projecting from the bar and guided therein for radial adjustment to vary the diameter of the work hole bored thereby, a shaft journaled in said bar to turn about an axis extending transversely thereof, motion-reducing means mounted within said bar and transmitting the turning of said shaft to said tooth to set the same outwardly, and a star wheel fast on said shaft at one side of the bar and having teeth each of which may, by indexing of the wheel, be disposed transversely of the bar in a predetermined position in which one side of the tooth in such position is exposed and faces longitudinally of the bar so as to be engageable with and blocked by a stop disposed adjacent the bar and in the path of such tooth whereby axial movement of the bar, after engagement of the stop and the wheel tooth in such position, turns said shaft through an angle determined by the duration of the engagement and in a direction to adjust said cutting tooth outwardly a corresponding increment.

18. A boring bar as defined in claim 17 in which the pitch and length of said star wheel teeth are such that upon disengagement of said stop from one tooth, the leading side of the next adjacent wheel tooth is disposed in said predetermined position and extends transversely of the bar.

19. A boring bar as defined in claim 17 in which said motion-reducing means includes screw and nut elements relatively rotatable to advance said cutting tooth outwardly, and a worm wheel rotatable with one of said elements and meshing with a worm fast on said shaft.

20. A boring bar as defined in claim 17 in which said cutting tooth is spaced angularly around said bar from the line of engagement between said stop and said wheel teeth.

21. A boring bar as defined in claim 17 including a second cutting tooth, shaft, motion-reducing mechanism, and star wheel similarly mounted on said bar but spaced axially along the bar with the star wheel rotatable in the same plane as said first star wheel.

References Cited
UNITED STATES PATENTS

| 2,484,480 | 10/1949 | Anderson | 77—56 |
| 3,121,350 | 2/1964 | Warsewa et al. | 77—57 |
| 3,300,010 | 1/1967 | Irish | 77—58 |

GERALD A. DOST, Primary Examiner

U.S. Cl. X.R.

77—1, 58